United States Patent
Collins (10) Patent No.: US 8,700,462 B2
(45) Date of Patent: Apr. 15, 2014

(54) SYSTEM AND METHOD FOR OPTIMIZING ADVERTISEMENT CAMPAIGNS USING A LIMITED BUDGET

(75) Inventor: Robert J. Collins, Carlsbad, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1027 days.

(21) Appl. No.: 11/607,292

(22) Filed: Nov. 30, 2006

(65) Prior Publication Data

US 2007/0157245 A1    Jul. 5, 2007

Related U.S. Application Data

(63) Continuation-in-part of application No. 11/321,729, filed on Dec. 28, 2005, now Pat. No. 7,949,562.

(51) Int. Cl.
*G06Q 30/00* (2012.01)
*G05B 19/418* (2006.01)

(52) U.S. Cl.
USPC ............. 705/14.41; 725/46; 707/999.007; 705/14.73

(58) Field of Classification Search
USPC ............. 705/14, 14.73; 725/46; 707/999.007
See application file for complete search history.

(56) References Cited

U.S. PATENT DOCUMENTS

| | | | |
|---|---|---|---|
| 5,848,396 A * | 12/1998 | Gerace | 705/10 |
| 6,269,361 B1 * | 7/2001 | Davis et al. | 707/3 |
| 6,757,661 B1 * | 6/2004 | Blaser et al. | 705/14 |
| 7,363,302 B2 * | 4/2008 | Lester | 707/7 |
| 7,716,219 B2 * | 5/2010 | Sarukkai et al. | 707/735 |
| 2003/0033292 A1 * | 2/2003 | Meisel et al. | 707/3 |
| 2006/0026063 A1 * | 2/2006 | Collins | 705/14 |
| 2006/0173744 A1 * | 8/2006 | Kandasamy et al. | 705/14 |
| 2006/0212350 A1 * | 9/2006 | Ellis et al. | 705/14 |
| 2006/0248035 A1 * | 11/2006 | Gendler et al. | 707/1 |

OTHER PUBLICATIONS

"DoubleClick Q2 Ad Serving Trend Data and Continental Airlines Study Demonstrate Significance of Post-Impression Metrics in Online Advertising" Publication info: PR Newswire [New York] Jul. 26, 2004.*

* cited by examiner

*Primary Examiner* — Victoria Vanderhorst
(74) *Attorney, Agent, or Firm* — Nathan O. Greene; Brinks Gilson & Lione (57) ABSTRACT

The present invention relates to methods, systems, and computer readable media comprising instructions for generating a media plan for the distribution of one or more advertisements comprising a campaign. The method of the present invention comprises retrieving one or more advertiser specified advertising metric target values and analytics data associated with the campaign. The actual performance of the campaign with respect to one or more advertising metrics associated with the one or more advertiser specified advertising metric target values is determined. A modification is performed of one or more advertiser specified values based upon a comparison of the actual performance of the campaign and the one or more advertiser specified advertising metric target values. A media plan is thereafter generated for the campaign through use of the one or more modified advertiser specified values.

46 Claims, 5 Drawing Sheets

SYSTEM AND METHOD FOR OPTIMIZING ADVERTISEMENT CAMPAIGNS USING A LIMITED BUDGET

The present Application is a Continuation-in-Part of U.S. application Ser. No. 11/321,729, filed Dec. 28, 2005 now U.S. Pat. No. 7,949,562, the disclosure of which is hereby incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

This invention relates in general to advertising, and in particular to advertising campaign management and optimization systems and methods. More specifically, the present invention provides methods and systems for facilitating the selection and delivery of advertisements using advertiser imposed constraints and targets to generate one or more media plans for distributing one or more advertisements.

An advertisement campaign may include a set of one or more advertising activities or conduct directed to accomplishing an advertising goal, such as the marketing or sales of a particular product, service, or content, or a group of products, services or content. The success of an advertising campaign depends on making the most efficient possible use of an advertising budget so as to maximally influence audience behavior. For example, if a campaign is directed to selling a product, then the advertiser may seek to use a given budget to purchase advertising so as to cause a maximum amount of consumers to purchase the product. Determining how to efficiently and optimally spend an advertising budget, as well as implementing and managing an ongoing advertising campaign utilizing such a budget, can pose a daunting challenge to advertisers.

Increasingly, advertising campaigns include online or Internet-based advertising. With ever-increasing Internet use, it is only natural that greater advertising resources are directed to this growing audience. Furthermore, Internet-based advertising allows great opportunities for advertisers to deliver much more targeted, relevant ads than conventional, off-line advertising techniques, such as billboards and the like.

An increasingly important area of advertising includes sponsored listings. Such listing can be presented, for example, in the form of sponsored links appearing among the results of a search conducted using an Internet-based search engine, such as Yahoo!, Ask Jeeves, etc. For instance, auction-based systems exist in which advertisers bid to be included among the sponsored search results for a particular search term or terms, and for the ranking or position of the placement of their sponsored listing among such results.

Online advertisers participating in such an auction-based system may face the challenge of managing and optimizing the ongoing bid process, for example, managing and optimizing thousands or hundreds of thousands of search terms or groups of search terms. Moreover, an advertiser may need to manage and optimize numerous advertising campaigns across numerous disparate advertising channels. A "channel" includes, but is not limited to, a particular entity, organization, or the like, through which advertising may be conducted. In the on-line advertising context, for example, channels can include web sites or search engines such as Yahoo!, MSN, CNN, etc.

While methods exist for the automatic bidding and maintenance of advertisement campaigns, current techniques do not provide advertisers with the ability to specify a maximum budget and have such a budget optimally spent on one or more advertisements in one or more campaigns. Advertisers may desire information specifying how a limited budget should be spent, the success of one or more advertisements in one or more campaigns and how profit may be maximized for a given budget. Additionally, before an advertiser modifies the money spent on one or more campaigns, an advertiser may desire information specifying how such a modification will affect profit, the number of users who view one or more advertisements, etc.

In order to overcome shortcomings associated with existing advertisement management and optimization techniques, embodiments of the present invention provide systems and methods for allowing an advertiser to manage one or more advertisement campaigns within a budget and further view and implement one or more advertising media plans providing a prediction of the performance of one or more advertisements in a given advertiser's budget.

SUMMARY OF THE INVENTION

The present invention is directed towards methods, systems, and computer readable media comprising program code for generating a media plan for the distribution of a campaign comprising one or more advertisements. According to one embodiment of the invention, the method comprises retrieving one or more advertising metric target values associated with the campaign. The one or more advertising metric target values may comprise values indicating a desired return on advertisement spend, desired cost per impression of an advertisement in the campaign, or desired cost per selection of an advertisement in the campaign.

The method further comprises retrieving analytics data associated with the campaign, wherein the analytics data may include data indicating a frequency with which the one or more advertisements in the campaign were selected by one or more users or data indicating the frequency with which the one or more advertisements in the campaign were displayed to one or more users. The analytics data may further include data indicating the frequency with which the one or more advertisements in the campaign resulted in one or more users browsing an advertiser website, data indicating the frequency with which the one or more advertisements in the campaign resulted in or more users adding one or more items to a shopping cart on an advertiser web site, data indicating the frequency with which the one or more advertisements in the campaign resulted in one or more conversions, or data indicating the revenue generated by one or more conversions.

The actual performance of the campaign with respect to one or more advertising metrics associated with the one or more advertiser specified advertising metric target values is determined. According to one embodiment, determining the actual performance of the campaign comprises calculating one or more advertising metric values through use of the analytics data associated with the campaign.

A modification of one or more advertiser specified values (which may be one or more funnel values) may be performed based upon a comparison of the actual performance of the campaign and the one or more advertiser specified advertising metric target values. According to one embodiment, performing a modification comprises determining a difference between the actual performance of the campaign and the one or more advertiser specified advertising metric target values, and modifying the one or more advertiser specified funnel values based upon the determined difference.

An advertiser specified value may comprise a funnel value, which may include an indication of a value of displaying a given advertisement in the campaign, a value of a user selection of an advertisement in the campaign, or the value of a user selecting an advertisement in the campaign and browsing an advertiser web site associated with the selected advertisement. A funnel value may further comprise a value of a given user selecting an advertisement and adding one or more items to a shopping cart on an advertiser web site, a value of a user purchasing one or more products in response to a given advertisement in the campaign, and the value of the revenue generated from a user purchase of one or more products in response to a given advertisements in the campaign.

According to another embodiment, an advertiser specified value may comprise a budget, indicating a maximum dollar amount to be spent on the campaign. Alternatively, or in conjunction with the foregoing, an advertiser specified value may comprise a constraint, such as a maximum bid amount, or a minimum position at which the one or more advertisements may be displayed in a ranked list of one or more advertisements.

The modifications performed with respect to the one or more advertiser specified values may comprise an increase or decrease of the one or more advertiser specified values. The modified advertiser specified values may be used to generate a media plan identifying one or more execution parameters for distributing the one or more advertisements in the campaign.

The present invention is further directed towards computer readable media comprising program code that when executed instructs a processor to perform a method for generating a media plan for the distribution of one or more advertisements comprising a campaign. According to one embodiment, the method performed by the processor comprises instructions for retrieving one or more advertiser specified advertising metric target values associated with the campaign, which may include a value indicating a desired cost per acquisition of a conversion or a desired return on advertisement spend. The instructions for retrieving one or more advertiser specified advertising metric target values may further comprise instructions for retrieving a value indicating a desired cost per impression of an advertisement in the campaign or cost per selection of an advertisement in the campaign.

The method performed by the processor further comprises instructions for retrieving analytics data associated with the campaign, wherein the analytics data may include data indicating the frequency with which the one or more advertisements in the campaign resulted in one or more users browsing an advertiser web site or data indicating the frequency with which the one or more advertisements in the campaign were selected by one or more users. The analytics data may further include data indicating the frequency with which one or more advertisements in the campaign resulted in one or more users adding one or more items to a shopping cart on an advertiser web site, data indicating the frequency with which one or more advertisements in the campaigned resulted in one or more conversions, data indicating the frequency with which one or more advertisements in the campaign were displayed to one or more users, as well as the revenue generated by the campaign with respect to the one or more conversions.

Instructions for determining an actual performance of the campaign with respect to one or more advertising metrics associated with the one or more advertiser specified advertising metric target values are thereafter executed. According to one embodiment, the instructions comprise instructions for calculating one or more advertising metric values through use of the analytics data associated with the campaign.

A modification is performed of one or more advertiser specified values based upon a comparison of the actual performance of the campaign and the one or more advertiser specified advertising metric target values. According to one embodiment, a difference between the actual performance of the campaign and the one or more advertiser specified advertising metric target values is determined. Instructions are thereafter performed for modifying the one or more advertiser specified funnel values based upon the determined difference.

According to one embodiment, the instructions for performing a modification comprise instructions for performing an increase or decrease of the one or more advertiser specified values. An advertiser specified value may comprise a funnel value, wherein a funnel value may comprise an indication of a value of displaying a given advertisement in the campaign, a value of a user selection of an advertisement in the campaign, or a value of a given user selecting an advertisement in the campaign and browsing an advertiser web site associated with the selected advertisement. A funnel value may further comprise an indication of a user selecting an advertisement and adding one or more items to a shopping cart on an advertiser web site, a value of a user purchasing one or more products in response to a given advertisement in the campaign, and the value of the revenue generated from a user purchase of one or more products in response to a given advertisement in the campaign.

An advertiser specified value may further comprise a budget, wherein a budget may comprise a maximum dollar amount to be spent on the campaign. Alternatively, or in conjunction with the foregoing, an advertiser specified value may comprise a constraint, such as a minimum position at which the one or more advertisements in the campaign may be displayed in a ranked list of one or more advertisements, or a maximum bid amount.

Instructions for generating a media plan for distributing the one or more advertisements are thereafter performed. According to one embodiment, instructions for generating a media plan comprise instructions for identifying one or more execution parameters for distribution parameters for distributing the one or more advertisements in the campaign through use of the modified advertiser specified values.

The present invention is further directed towards a system for generating a media plan for the distribution of one or more advertisements comprising a campaign. According to one embodiment, the system of the present invention comprises an actual performance component operative to determine an actual performance of the campaign with respect to one or more advertising metrics associated with one or more advertiser specified advertising metric target values. The advertiser specified advertising metric target values may comprise values indicating a desired cost per acquisition of a conversion, desired return on advertisements spend, desired cost per impression of an advertisement in the campaign, or a desired cost per selection of an advertisement in the campaign.

The actual performance of the campaign may be determined through use of analytics data associated with the campaign. The analytics data may include data indicating the frequency with which one or more advertisements in the campaign were selected by one or more users, or the frequency with which one or more advertisements in the campaign were displayed to one or more users. The analytics data may further include data indicating the frequency with which the one or more advertisements in the campaign resulted in one or more users browsing an advertiser website, data indicating the frequency with which the one or more advertisements in the campaign resulted in one or more users adding one or more items to a shopping cart on an advertiser website, data indicating the frequency with which the one or more advertisements in the campaign resulted in one or more conversions, as well as data indicating the revenue generated by the one or more conversions.

The system further comprises an extended campaign optimizer operative to perform a modification of one or more advertiser specified values based upon a comparison of the actual performance of the campaign and the one or more advertiser specified advertising metric target values. According to one embodiment of the present invention, the extended campaign optimizer is operative to determine a difference between the actual performance of the campaign and the one or more advertiser specified advertising metric target values. The extended campaign optimizer may thereafter modify the one or more advertiser specified values based upon the determined difference, which may comprise increasing or decreasing the one or more advertiser specified values.

According to one embodiment, an advertiser specified value comprises a funnel value, wherein a funnel value comprises an indication of the value of displaying a given advertisement in the campaign, the value of a user selection of an advertisement in the campaign, or the value of a given user selecting an advertisement in the campaign and browsing an advertiser website associated with the selected advertisement. A funnel value may further comprise an indication of the value of a given user selecting an advertisement and adding one or more items to a shopping cart on an advertiser website, the value of a given user purchasing one or more products in response to a given advertisement in the campaign, and the revenue generated by a user purchase of one or more products in response to a given advertisement in the campaign.

According to another embodiment, an advertiser specified value comprises a budget indicating the maximum dollar amount to be spent on a given campaign. An advertiser specified value may further comprise a constraint, such as a maximum bid amount or a minimum position at which the one or more advertisements in the campaign may be displayed in a ranked list of one or more advertisements.

A campaign optimizer may thereafter generate a media plan for the campaign through use of the one or more modified advertiser specified values. According to one embodiment, the campaign optimizer is operative to generate a media plan identifying one or more execution parameters for distributing the one or more advertiser in the campaign through use of the one or more modified advertiser specified values.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENT

In the following description of the preferred embodiment, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
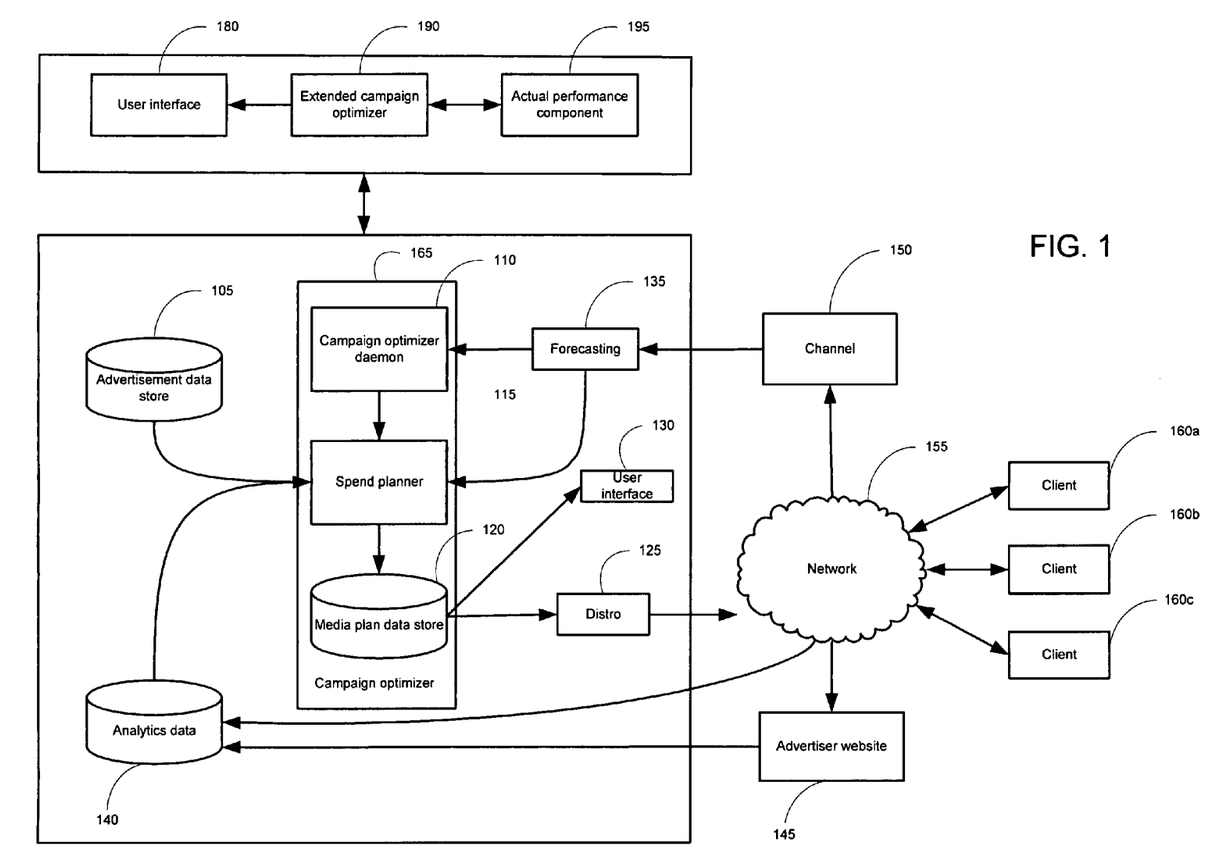
FIG. 1 is a block diagram presenting a system for generating media plans for one or more advertisements within advertiser specified constraints, according to one embodiment of the present invention.

FIG. 1 is a block diagram illustrating a system for generating one or more media plans for the delivery of one or more advertisements. According to the embodiment of FIG. 1, one or more advertisement campaigns comprising one or more advertisements are stored in an advertisement data store 105. Advertising campaigns may include sponsored search listings or links to an advertiser's webpage.

A budget associated with the one or more campaigns may be stored in the advertisement data store 105. A budget comprises an indication of the maximum dollar value a given advertiser has available to spend on the one or more advertisements in an advertiser's one or more campaigns.

In addition to budget information, the advertisement data store 105 may also contain targets and constraints, which may be generally described as performance goals and restrictions upon advertising, respectively. For example, a constraint may comprise a limit upon a bid amount in an auction-based system or marketplace for advertising. A marketplace may be used to place bids on search terms or groups of terms that when used in a search query cause the display of an advertiser's advertisements or links to advertisements among the displayed results. Bids may also be made to secure prominence and positions for an advertiser's one or more advertisements in response to a given search query. For example, an advertiser may desire to display a given advertisement or group of advertisements in response to one or more terms and may further desire to display the advertisement in a particular position of a result set that a search engine returns. Through the use of a marketplace or auction-based system, bids may be placed on the one or more terms corresponding to the advertisements the advertiser wishes to display. The advertisers with the greatest bids for one or more keywords may have their advertisements displayed in the most prominent positions of a given result set of advertisements.

Figure 2:
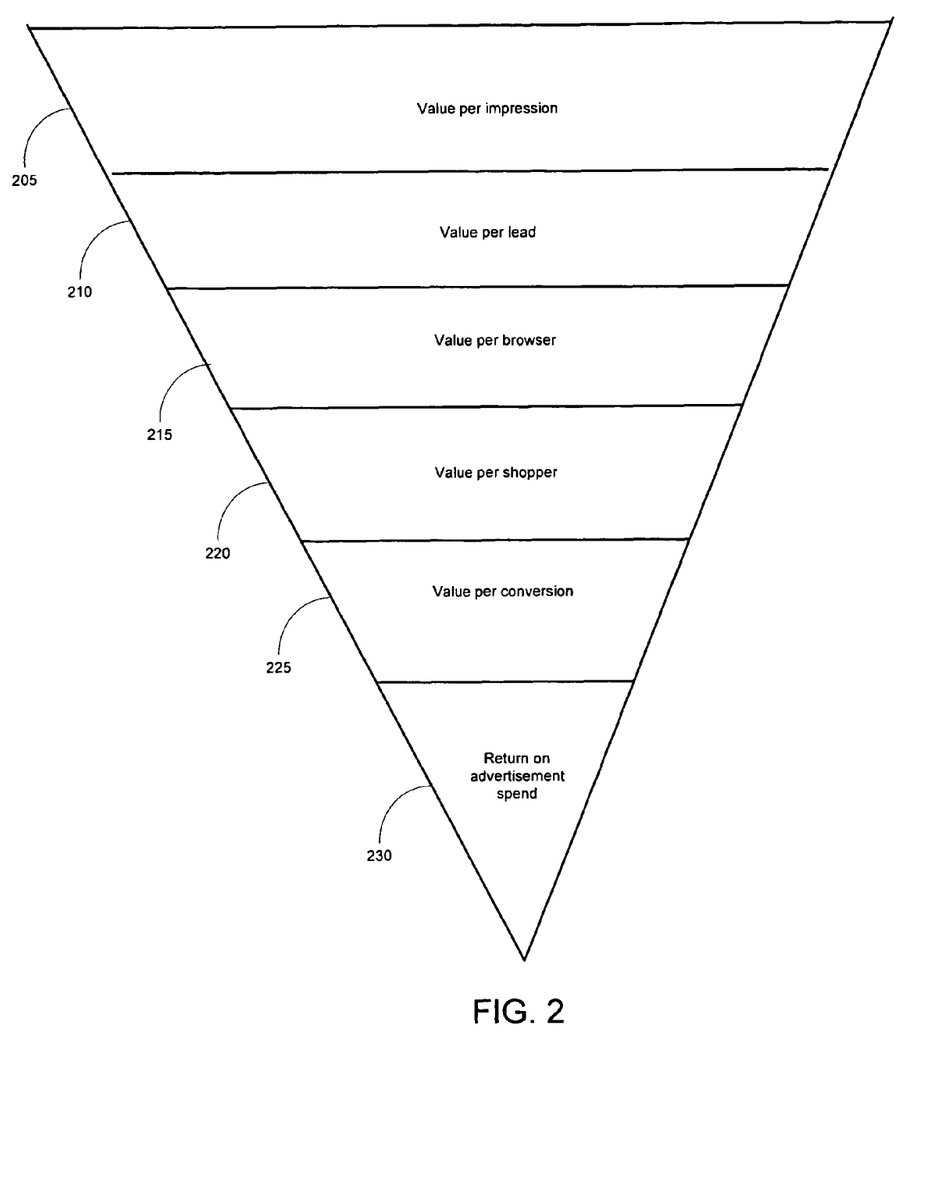
FIG. 2 is a screen diagram presenting a value funnel for collecting one or more advertising events associated with an advertisement, according to one embodiment of the present invention.

A target may comprise an indication of the cost per acquisition ("CPA") or return on advertisement spend ("ROAS") for a given advertisement. Cost per acquisition generally relates to an advertiser's cost for a given advertising event or metric. Advertising events or metrics include, but are not limited to, impressions, leads, browsers, shoppers and conversions, where impressions comprise the display of one or more advertisements, leads comprise selection of one or more advertisements by a user, browsers comprise users accessing one or more pages of an advertiser's website associated with a given advertiser's products or services, shoppers comprise users who add products to a shopping cart displayed by a given advertisement, and conversions comprise purchases of products advertised by an advertisement selected by a user. For example, if a given advertisement resulted in two hundred purchases, and the advertisement cost an advertiser one thousand dollars to display, the advertiser's cost per acquisition for conversions would equal five dollars. Similarly, if a given advertisement cost an advertiser one hundred dollars to display and the advertisement was selected five thousand times, the advertiser's cost per acquisition for leads would equal two cents. According to methods described herein, an advertiser may specify the cost per acquisition for one or more advertising events or metrics according to a value funnel, as illustrated in FIG. 2.

Return on advertisement spend (ROAS) generally comprises the revenue earned on one or more advertisements displayed to users. Advertisers may have a plurality of advertisements to display to users of client devices in response to various search requests. Furthermore, advertisers may pay a fee for displaying advertisements in response to various search requests. While an advertiser may display a plurality of advertisements directed at various products offered by the advertiser, only a few of the advertisements displayed may result in actual purchases. An advertiser may want to ensure that the amount of money earned on purchases exceeds the amount of money spent on advertising. According to methods described herein, an advertiser may specify the return on advertisement spend for one or more advertisements.

According to one embodiment of the invention, an advertiser may specify a maximum bid constraint for storage in the advertisement data store 105. A maximum bid constraint may comprise an indication of the greatest dollar value an advertiser is willing to spend on any one or more advertisements in one or more campaigns. According to one embodiment of the invention, an advertiser may specify a maximum bid constraint for one or more individual advertisements. According to another embodiment of the invention, an advertiser may specify a maximum bid constraint for all advertisements in a given campaign. According to yet another embodiment of the invention, an advertiser may specify a maximum bid constraint for all advertisements in a given budget.

An advertiser may also specify a target minimum position. A target minimum position may comprise an indication of the lowest allowable ranking at which one or more advertisements may be displayed in a ranked list of advertisements. For example, an advertiser may indicate a desire to have one or more advertisements ranked either first, second or third in a ranked list of advertisements. Therefore, the advertiser may define a target minimum position of three (3). According to one embodiment of the invention, an advertiser may specify a target minimum position for one or more individual advertisements. According to another embodiment of the invention, an advertiser may specify a target minimum position for all advertisements in a given campaign. According to yet another embodiment of the invention, an advertiser may specify a target minimum position for all advertisements in a given budget.

An advertiser may also specify the values for one or more advertising events or metrics in a value funnel (illustrated in FIG. 2). According to one embodiment of the invention an advertiser may specify values associated with impressions, leads, browsers, shoppers, conversions, the value associated with revenue generated by one or more conversions, as well as one or more target values, such as return on advertisement spend and cost per acquisition. The one or more values specified by an advertiser are stored in the advertisement data store 105 with associated advertisements or campaigns. The values allow an advertiser to indicate the value of one or more advertising events or metrics for the one or more advertisements in a given budget.

The analytics data store 140 is operative to store click through data for the one or more advertisements stored in the advertisement data store 105. According to one embodiment of the invention, the analytics data store 140 maintains data on the number of times a given advertisement was selected, the time a given advertisement was displayed and user characteristics of a given user that selected a given advertisement, e.g., by reference to a profile for the given user. According to another embodiment of the invention, the analytics data store 140 maintains data pertaining to one or more keywords submitted by users of client devices 160*a*, 160*b* and 160*c*. For example, the analytics data store 140 may maintain information indicating the cost for displaying an advertisement in response to a given user search query. According to yet another embodiment of the invention, the analytics data store 140 maintains data on the one or more values in a value funnel for one or more advertisements.

The analytics data store 140 is an accessible memory structure such as a database, CD-ROM, tape, digital storage library, etc., and may be implemented as a database or any other type of data storage structure capable of providing for the retrieval and storage of a variety of data types. The analytics data store 140 may also store a variety of data related to advertisements. Information in the analytics data store 140 may be maintained in advertisement groups according to advertiser, product, category, keywords, funnel values or a combination thereof.

One or more advertisements, constraints, targets, funnel values and budget information for an advertiser are delivered to the spend planner component 115. The spend planner component 115 is operative to generate one or more execution plans identifying the one or more execution parameters for one or more advertisements in a given advertiser's budget. According to one embodiment of the invention, the execution parameters of an execution plan identified by the spend planner component 115 are based upon the one or more aspects of an advertisement that a channel 150 allows to be varied. For example, Yahoo! may allow an advertiser to vary the bid associated with the keywords for displaying a given advertisement or whether a given advertisement is online or offline. The execution parameters of the one or more execution plans identified by the spend planner component 115 may alter whether the one or more advertisements in a given advertiser's budget are online or offline while also altering the bid amount associated with the one or more advertisements in a given advertiser's budget.

The one or more execution parameters of a given execution plan that the spend planner component 115 generates may also be based upon the one or more advertiser specified advertisement constraints. For example, as previously described an advertiser may set a maximum bid constraint on one or more advertisements in a given advertiser's budget. The execution parameters that the spend planner component 115 generates for a given execution plan respect the advertiser's constraints and not identify bid execution parameters that violate a given advertiser's one or more bid constraints.

The one or more execution parameters for a given execution plan generated by the spend planner component 115 are annotated with forecast data from the forecasting component 135. According to one embodiment of the invention, the spend planner component 115 delivers one or more keywords associated with displaying one or more advertisements in a given advertiser's budget to the forecasting component 135. The forecasting component 135 is operative to retrieve information regarding the one or more advertisements displayed in response to the one or more keywords delivered to the forecasting component 135.

The forecasting component 135 retrieves information for the one or more advertisements based upon one or more steps in a value funnel, as well as the bid associated with a given advertisement and its position in a ranked list of advertisements. For example, the spend planner component 115 may deliver the key words "notebook computer" to the forecasting component 130. The forecasting component 130 may retrieve historical information regarding the one or more advertisements displayed in response to the key words "notebook computer", the bids associated with the one or more advertisements, as well as the position of the one or more advertisements in a ranked list of advertisements.

The forecasting component 135 may further be operative to retrieve historical data regarding the one or more advertisements displayed in response to the key words "notebook computer" based upon the one or more steps in the value funnel. For example, the forecasting component 135 may retrieve historical data indicating that a given advertisement received two hundred impressions, eighty leads, forty browsers, eight shoppers and four conversions. The forecast component 135 may retrieve historical data from the analytics data store 140 indicating the number and type of advertising events obtained at various bid amounts for one or more key words, as well as the position of one or more advertisements in a ranked list of advertisements displayed in response to the given key words. According to one embodiment of the invention, the forecast component 135 calculates the average number of advertising events obtained at various bid amounts for the one or more advertisements displayed in response to one or more key words to provide a forecast of the expected number of advertising events that may be obtained at various bid amounts.

The various execution parameters generated by the spend planner component 115 for a given execution plan are annotated by the spend planner component 115 with the forecast data from the forecasting component 135. For example, the execution parameters for a given execution plan may identify various bid amounts associated with the one or more advertisements in the execution plan. The forecast data as obtained from the forecasting component 135 may be used to annotate the execution parameters at each respective bid amount and may indicate the varying levels of funnel values (as illustrated in FIG. 2) that are obtained at varying bid amounts. According to one embodiment of the invention, the forecast data may indicate the number of impressions, leads, browsers, shoppers and conversions obtained at one or more bid amounts. Table A illustrates an exemplary execution plan wherein advertisements are annotated with forecasting information from the forecasting component 135.

TABLE A

| Advertisement | Bid associated with the one or more key words for displaying the advertisement | Average position in ranked list of advertisements | Average forecast values for advertisement at bid amount and position |
|---|---|---|---|
| A1 | $2.50 | 7 | Impressions: 200<br>Leads: 120<br>Browsers: 40<br>Shoppers: 18<br>Conversions: 2 |

TABLE A-continued

| Advertisement | Bid associated with the one or more key words for displaying the advertisement | Average position in ranked list of advertisements | Average forecast values for advertisement at bid amount and position |
|---|---|---|---|
| A2 | $1.50 | 5 | Impressions: 300<br>Leads: 320<br>Browsers: 60<br>Shoppers: 28<br>Conversions: 4 |
| A3 | $2.00 | 3 | Impressions: 500<br>Leads: 420<br>Browsers: 92<br>Shoppers: 42<br>Conversions: 12 |

The one or more execution parameters annotated with forecast data may be further annotated with advertisement specific analytics data stored in the analytics data store 140. According to one embodiment of the invention, the analytics data store 140 maintains information identifying the various advertising events associated with a given advertisement. For example, the analytics data store 140 may indicate that a given advertisement displayed in response to the key words "notebook computer" resulted in forty user selections and twelve purchases with an associated bid of $4. The forecast data obtained from the forecasting component 135, however, may indicate that the average advertisement displayed in response to the term "notebook computer" at a bid of $4 resulted in three hundred user selections and four purchases. Therefore, the execution parameters for the one or more advertisements in a given advertiser's budget are annotated with advertisement specific analytics data to provide a more accurate prediction of the number of advertising events a given advertisement obtains when displayed in response to a given one or more key words at a given bid amount.

The spend planner component 115 uses the annotated execution parameters of the one or more execution plans, as well as a given advertiser's budget, constraints and funnel values to generate one or more media plans. A media plan generated by the spend planner component 115 identifies the optimal execution parameters used in conjunction with a given set of advertisements in an advertiser's budget. According to one embodiment of the invention, a media plan identifies the optimal bid amounts for the advertisements in a given advertiser's budget.

The spend planner component 115 generates one or more media plans with execution parameters that do not exceed the one or more constraints associated with a given budget. As previously described, a budget specifies the maximum dollar value an advertiser is willing to spend on one or more advertisements in one or more campaigns. The spend planner component 115 is operative to formulate one or more media plans that apportion a given advertiser's budget, ensuring that a given budget is not exceeded. According to one embodiment of the invention, the spend planner component 115 attempts to utilize all available funds in a given advertiser's budget.

The spend planner component 115 uses a scoring function to calculate an efficiency value for the one or more advertisements in a given advertiser's budget. The efficiency values associated with the one or more advertisements in a given budget are used to select advertisements to be included in a given media plan. According to one embodiment of the invention, the scoring function utilizes the forecasted funnel values, the advertisement specific analytics data, and the advertiser specified funnel values to calculate the efficiency of a given advertisement. According to one embodiment, the one or more advertisements in a given advertiser's budget are sorted in descending order by efficiency value. Advertisements with the greatest efficiency values are selected for inclusion in a given media plan until exhaustion of an advertiser's budget. The cost associated with a given advertisement is an emergent property based upon the efficiency value as calculated by the scoring function. The scoring function determines the bid value associated with a given advertisement based upon the calculated efficiency of the advertisement without exceeding a given advertiser's constraints. Various bid amounts are analyzed to determine the bid amount that produces the greatest efficiency for a given advertisement.

The one or more media plans generated by the spend planner component may be stored in the media plan data store 120. According to one embodiment of the invention, each media plan has a set of associated attributes. The attributes associated with a media plan may include, but are not limited to, a name, the budget of the campaign or campaigns for which the media plan was generated and a date, which may indicate the period of time a media plan is to be executed.

Media plans generated by the spend planner component 115 and stored in the media plan data store 120 may be viewed by advertisers through the user interface 130. According to one embodiment of the invention, an advertiser may select a media plan from the media plan data store 120 for execution. According to another embodiment of the invention, the spend planner component 115 selects a media plan from the media plan data store 120 for execution. According to yet another embodiment, the user interface 130 provides an advertiser with the ability to examine the projected outcome of a given media plan without actually executing the media plan. The execution parameters for a given media plan, with annotated forecast values, allow an advertiser to view the projected outcome of the media plan with respect to the one or steps of the value funnel. According to a further embodiment of the invention, an advertiser may utilize the user interface 130 to increase or decrease the budget associated with one or more advertisements stored in the advertisement data store 105 to determine how the increase or decrease in budget will affect the performance and outcome of one or more advertisements.

A media plan selected for execution either by an advertiser using the user interface 130 or by the spend planner component 115, is delivered to the distribution component 125. The distribution component 125 is operative to deliver the one or more advertisements and bid execution parameters of a media plan to one or more channels 150. A channel 150, such as Yahoo.com, may be operative to receive one or advertisements and associated bids and distribute one or more advertisements according to the bids associated with the one or more advertisements. Users of client devices 160a, 160b and 160c communicatively coupled to the network 155 may select one or more of the advertisements displayed by a given channel 150 as part of a web page. If a user of a client device 160a, 160b and 160c selects an advertisement displayed on a given web page, the user may be redirected to an advertiser's web site 145. Users' interactions with an advertisement and web page are tracked and may be delivered to the analytics data store 140.

The analytics data delivered to the analytics data store 140 for one or more advertisements in a given campaign may be utilized by an extended campaign optimizer 190 to perform a comparison of the actual performance of the campaign with respect to one or more advertiser specified target values associated with the campaign. As previously described, an advertiser may specify one or more target values, including, but not limited to, the cost per acquisition and return on advertisement spend associated with one or more advertisements in a given campaign. For example, an advertiser may specify a target cost per acquisition of conversions of $10 for a given campaign associated with a budget of $10,000, indicating that the advertiser wishes to receive 1,000 conversions in exchange for spending $10,000.

The extended campaign optimizer 190 is operative to retrieve the analytics data associated with one or more advertisements in a given campaign and deliver the retrieved analytics data to an actual performance component 195. The actual performance component calculates the actual performance of the one or more advertisements in the campaign through use of the analytics data. For example, the analytics data for one or more advertisements in a given campaign associated with a budget of $1000 may indicate that the advertisements resulted in 100 conversions. The actual performance component 195 may thus determine that the cost per acquisition of conversion associated with the campaign is $10.

The extended campaign optimizer 190 may thereafter perform a comparison of the actual performance of a given campaign, as determined by the actual performance component 195, and the advertiser specified target values associated with the campaign. Based upon the comparison, the extended campaign optimizer 190 may modify any of the one or more values associated with the campaign that are specified by the advertiser, including, but not limited to, the advertiser specified budget, constraints, funnel values, etc., to achieve the advertiser specified target values. For example, the actual performance component 195 may determine that the actual performance of a given campaign with respect to cost per acquisition of conversions is $10. The extended campaign optimizer 190 may identify that the target cost per acquisition of conversions specified by an advertiser associated with the campaign is $8.

The extended campaign optimizer 190 may modify one or more of the advertiser specified values, such as the budget associated with the campaign, or the one or more advertiser specified funnel values associated with impressions, leads, browsers, shoppers, conversions, and the value associated with revenue from conversions. The modifications performed by the extended campaign optimizer 190 with respect to the one or more values that may be specified by an advertiser increase the likelihood that the actual performance of a given campaign matches the target values specified by the advertiser associated with the campaign.

According to one embodiment of the invention, the extended campaign optimizer 190 increases or decreases the one or more advertiser specified values associated with a campaign by a predetermined amount, such as a percentage. For example, a given advertiser may specify that the relative value associated with impressions for a given campaign is 1, the relative value associated with leads for the campaign is 5, and the relative value associated with conversions is 20, indicating that the value of a lead is five ("5") times greater than the value of an impression, and the value of a conversion is twenty ("20") times greater than the value of an impression and four ("4") times greater than the value of a lead. The extended campaign optimizer 190 may identify that the target cost per acquisition of conversions specified by the advertiser is below the actual cost per conversions calculated by the actual performance component 195. Accordingly, the extended campaign optimizer 190 may increase the value of a conversion to twenty five ("25"). Alternatively, or in conjunction with the foregoing, the extended campaign optimizer may decrease the value associated with impressions to 0.5 and the value associated with leads to 3.

Similarly, a given advertiser may specify that a budget associated with a given campaign is $5,000 per month. The extended campaign optimizer 190 may determine that the advertiser specified budget of $5,000 per month was exceeded by an amount of $1,000 during a given month. Accordingly, the extended campaign optimizer 190 may decrease the available budget of the campaign to $4,000 in order to compensate for the $1,000 by which the advertiser specified budget was exceeded.

According to one embodiment of the invention, an advertiser may further modify the advertiser specified values modified by the extended campaign optimizer 190 through use of a user interface 180. With reference to the abovementioned examples, an advertiser may further increase the modified value of a conversion determined by the extended campaign optimizer 190 from twenty five ("25") to thirty ("30"). Similarly, the advertiser may further decrease the modified values of impressions and leads determined by the extended campaign optimizer 190 from 0.5 to 0.25 and from 3 to 2, respectively. Alternatively, or in conjunction with the foregoing, the advertiser may further decrease the available budget determined by the extended campaign optimizer 190 from $4,000 to $3,500. The campaign optimizer 165 may thereafter utilize the modified advertiser specified values to generate a media plan for the campaign.

The campaign optimizer daemon 110 is operative to invoke the spend planner component 115 to generate one or more media plans. According to one embodiment of the invention, the campaign optimizer daemon 110 invokes the spend planner component 115 when a given advertiser adds or deletes one or more advertisements from the advertisement data store 105. According to another embodiment of the invention, the campaign optimizer daemon 110 invokes the spend planner component 115 when an advertiser modifies one or more constraints or targets, or updates an existing budget.

According to yet another embodiment of the invention, the campaign optimizer daemon 110 invokes the spend planner component 115 upon receipt of an alert from the forecasting component 135 indicating a recent deviation in the frequency of search requests for one or more keywords submitted by users of client devices 160a, 160b and 160c to one or more channels 150. The forecast component may be operative to monitor one or more channels 150, such as the Yahoo! search engine. The forecasting component 135 may identify significant deviations in search requests for one or more keywords made by users of client devices 160a, 160b and 160c and alert the campaign optimizer daemon 110 of such deviations.

According to a further embodiment of the invention, the campaign optimizer daemon 110 invokes the spend planner component 115 at regular intervals, which may be predetermined. Alternatively, or in conjunction with the foregoing, the campaign optimizer daemon 110 invokes the spend planner component 115 when a given media plan is nearing expiration or has expired. For example, a given media plan may execute for a period of twenty-four hours. The campaign optimizer daemon 110 may notify the spend planner component 115 at a given time interval before a given media plan is expiring that a new media plan must be generated.

FIG. 2 presents an illustration of a value funnel data structure, wherein a value funnel comprises the one or more advertising events or metrics that may be associated with one or more advertisements. According to the value funnel illustrated in FIG. 2, an advertiser may specify the value per impression 205 for one or more advertisements, wherein an impression 205 comprises displaying an advertisement in response to a given request. For example, a given campaign $C_1$ for advertising a given advertiser's computer products may be comprised of advertisements $A_1, A_2, A_3 \ldots A_n$. Advertisement $A_1$ may be an advertisement for notebook computers whereas advertisements $A_2$ may be an advertisement for mouse pads. An advertiser may specify that the value per impression for displaying advertisement $A_1$ in response to the key words "notebook computer" is fifty cents, whereas the value per impression for displaying advertisement $A_2$ in response to the key words "mouse pads" is ten cents. An advertiser may specify the value per impression for one or more advertisements. Alternatively, an advertiser may specify the value per impression for all advertisements in a given campaign, group of advertisements, or advertisements in an advertiser's budget.

According to the value funnel illustrated in FIG. 2, an advertiser may also specify the value per lead 210 for one or more advertisements, which may comprise the value of a user selecting a given advertisement displayed in response to a given request. For example, an advertiser may have various advertisements directed at selling computer products, including mouse pads, Ethernet cords, wireless routers, hard drives, etc. With reference to the abovementioned campaign $C_1$, an advertiser may specify that the value per lead for a user selecting advertisement A1 directed at selling Ethernet cords is fifty cents, whereas the value per lead for a user selecting advertisement A2 directed at selling hard drives is four dollars. The advertiser may specify that the value per lead associated with a user selecting advertisement A2 for hard drives is greater than the value per lead associated with a user selecting advertisement A1 for an Ethernet cord since the purchase of a hard drive may result in greater profit for the advertiser. Those of skill in the art recognize other permutations are possible.

An advertiser may also specify a value per browser 215 for one or more advertisements, which according to one embodiment of the invention comprises the value associated with a user selecting a given advertisement and accessing one or more pages of a given advertiser's website associated with a given advertiser's products or services. With reference to the abovementioned campaign $C_1$, an advertiser may specify that the value of a user selecting advertisement $A_1$ and browsing the products associated with advertisement $A_1$ is four dollars, whereas the value of a user selecting advertisement $A_2$ and browsing the products associated with advertisement $A_2$ is two dollars. An advertiser may specify the value per browser for one or more advertisements. Alternatively, an advertiser may specify the value per browser for all advertisements in a given campaign or all advertisements in an advertiser's budget.

An advertiser may also specify a value per shopper 220 for one or more advertisements, which may comprise the value associated with a user selecting a given advertisement, accessing a given advertiser's webpage, and adding one or more of an advertiser's products to a shopping cart on the advertiser's webpage. With reference to the abovementioned campaign $C_1$, an advertiser may specify that the value of a user selecting advertisement $A_1$ and adding one or more items associated with advertisement $A_1$ to a shopping cart on the advertiser's web site is six dollars, whereas the value of a user selecting advertisement $A_2$ and adding one or more items associated with advertisement $A_2$ is three dollars. An advertiser may specify the value per shopper for one or more advertisements. Alternatively, an advertiser may specify the value per shopper for all advertisements in a given campaign or all advertisements in an advertiser's budget.

Similarly, an advertiser may specify a value per conversion 225 for one or more advertisements, which according to one embodiment of the invention comprises the value associated with a user purchasing a product or service displayed by a given advertisement. An advertiser's one or more advertisements may be directed at products that result in varying levels of revenue for the advertiser. For example, the revenue earned by a car dealer on the sale of a new car may be significantly greater than the revenue earned on the sale of a used car. An advertiser with one or more advertisements for new cars and one or more advertisements for used cars may specify that the value per conversion associated with a user purchasing a new car is greater than the value per conversion associated with a user purchasing a used car.

According to the embodiment illustrated at FIG. 2, an advertiser may also specify the return on advertisement spend (ROAS) 230, wherein return on advertisement spend 230 comprises an indication of the revenue earned on a given advertisement. For example, an advertiser may spend one dollar each time a given advertisement for a notebook computer is selected by a user. If the advertisement is selected four hundred times, the advertiser will spend a total of four hundred dollars on the advertisement. If every four hundred user selections results in a purchase of $1200, the advertiser's return on advertisement spend is the amount the advertiser earns on a given purchase ($1200), minus the amount the advertiser spent on the advertisement ($400), resulting in a return on advertisement spend of $800. Tracking codes inserted in a given advertisement and HTML tags inserted in a given advertiser's web page may be used to facilitate the identification of the return on advertisement spend. Those of skill in the art recognize that a value funnel may comprise one or more other advertising events or metrics and associated values that may be used to monitor the performance of a given advertisement.

Figure 3:
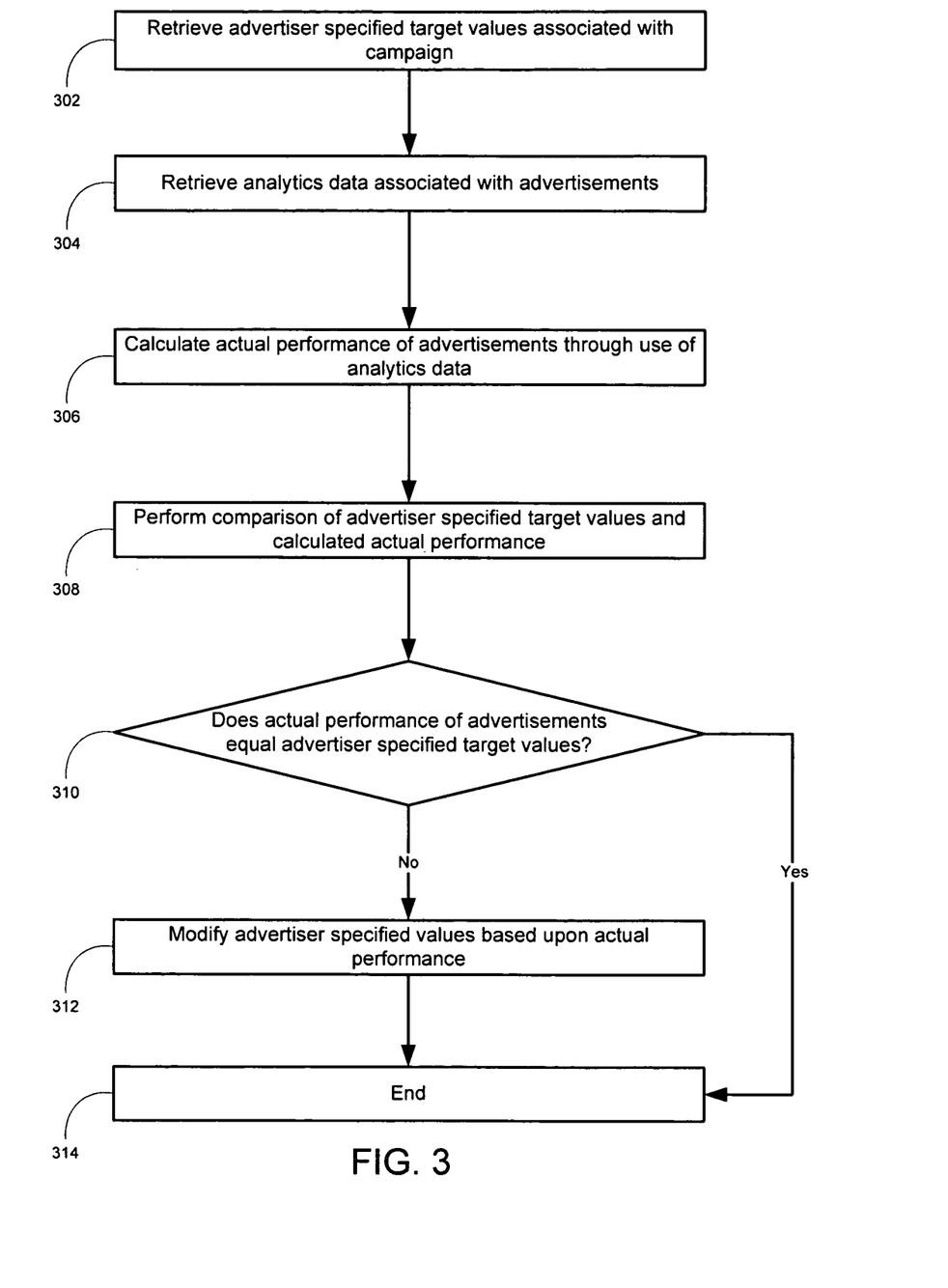
FIG. 3 is a flow diagram presenting a method for modifying one or more advertiser specified values associated with a campaign according to one embodiment of the present invention.

FIG. 3 is a flow diagram presenting one embodiment of a method for modifying one or more advertiser specified values associated with a given campaign based upon a comparison of the actual performance of the campaign and one or more advertiser specified target values. According to the embodiment illustrated in FIG. 3, one or more advertiser specified target values associated with a given campaign are retrieved or otherwise identified, step 302. A target value may comprise an indication of the revenue an advertiser wishes to receive for a given campaign. Similarly, a target value may comprise an indication of the cost an advertiser wishes to spend for receiving a given advertising metric, such as a conversion.

Analytics data associated with the one or more advertisements in the campaign are retrieved, step 304. The analytics data retrieved may include, but is not limited to, data indicating the frequency with which the one or more advertisements in the campaign were displayed or selected by one or more users, the frequency with which one or more advertisements in the campaign resulted in one or more conversions, the revenue generated by the one or more conversions, and the budget associated with the campaign. The analytics data may further include data indicating the frequency with which an advertisement resulted in a user accessing one or more pages of a given advertiser's website associated with a given advertiser's products or services or the frequency with which an advertisements resulted in a user accessing a given advertiser's web page, and adding one or more of an advertiser's products to a shopping cart on the advertiser's web page.

The actual performance of the campaign with respect to the advertiser specified target values is thereafter calculated through use of the retrieved analytics data, step 306. For example, an advertiser associated with the campaign may have specified a target value for cost per acquisitions of conversions. Accordingly, the calculation performed at step 306 may comprise a calculation to determine the actual performance of the campaign with respect to cost per acquisitions of conversions. Similarly, an advertiser associated with the campaign may have specified a target return on advertisement spend. Accordingly, the calculation performed at step 306 may comprise a calculation to determine the actual performance of the campaign with respect to return on advertisement spend. Alternatively, or in conjunction with the foregoing, an advertiser associated with the campaign may have specified a maximum budget for the campaign. The calculation performed at step 306 may thus comprise a calculation to determine the dollar amount spent on the campaign. Additionally, an advertiser associated with the campaign may have specified an average minimum position at which the one or more advertisements in the campaign may be displayed. Accordingly, the calculation performed at step 306 may comprise a determination of the average position at which the one or more advertisements in the campaign were displayed.

A comparison of the one or more advertiser specified target values and the calculated actual performance of the campaign is performed, step 308. For example, an advertiser specified target value for the cost per acquisition of conversions for a given campaign may comprise $15, indicating that the advertiser wishes to receive a conversion at a cost of $15. The actual calculated performance of the campaign with respect to cost per acquisitions of conversions may comprise $18, indicating that the cost per acquisitions of conversions exceeds the advertiser's target by $3. Similarly, an advertiser specified target value for the return on advertisement spend for a given campaign may comprise $100, indicating that the advertiser wishes to receive a profit of $100 for a given campaign. The actual calculated performance of the campaign with respect to return on advertisement spend may comprise $100, indicating that the return on advertisement spend is equal to the advertiser specified target value.

A check is thereafter performed to determine whether the actual performance of the campaign is equal to the one or more advertiser specified target values, step 310. If the actual performance of the campaign is not equal to the one or more advertiser specified target values, a modification is performed with respect to the one or more values that may be specified by the advertiser with respect to the campaign. For example, a modification may be performed with respect to the advertiser specified budget, the one or more advertiser specified constraints, or the one or more advertiser specified funnel values associated with the campaign.

According to one embodiment of the invention, the one or more advertiser specified values, including but not limited to, budget, constraints, and funnel values, correlate or map to a given advertiser specified target value. For example, an advertiser may specify a target value associated with the cost of acquiring one or more leads, which may correlate or map to the funnel value "leads." Similarly, an advertiser may specify a target value associated with one or more bids, which may correlate with or map to the advertiser specified maximum bid constraint. Alternatively, or in conjunction with the foregoing, an advertiser may specify a target value associated with the amount of money the advertiser wishes to spend on the campaign, which may map to or correlate with the advertiser specified budget.

According to one embodiment of the invention, a modification is performed with respect to the advertiser specified value that correlates or maps to an advertiser specified target. For example, as previously described, an advertiser may specify a target cost per acquisitions for conversions for a given campaign. If the actual performance of the campaign does not equal the advertiser specified target for cost per acquisitions for conversions, a modification may be performed with respect to the advertiser specified funnel value associated with conversions, such as increasing or decreasing the relative value associated with conversions with respect to the one or more advertising metrics in the value funnel. Similarly, an advertiser may specify a target cost per lead for a given campaign. If the actual performance of the campaign does not equal the advertiser specified target for the cost per lead, a modification may be performed with respect to the advertiser specified funnel value associated with leads.

The modifications of the advertiser specified values associated with the one or more metrics in the value funnel may be performed by a predetermined amount, such as a percentage or a fixed value. Alternatively, or in conjunction with the foregoing, an advertiser may specify a target budget for a given campaign. If the actual performance of the campaign does not equal the advertiser specified target budget, a modification may be performed with respect to the available budget for the campaign, such as decreasing the available budget if the target budget was exceeded, or increasing the available budget if the target budget was not entirely used.

According to another embodiment of the present invention, a modification is performed with respect to the one or more advertiser specified values that do not map or correlate to an advertiser specified target value. For example, an advertiser may specify a target number of conversions for a given campaign, which may correlate to the funnel value "conversions." If the actual performance of the campaign with respect to conversions generated does not equal the advertiser specified target number of conversions, a modification may be performed with respect to the advertiser specified funnel values that do not correlate to the advertiser specified target, such as leads, browsers, shoppers, and impressions, wherein the modification may comprise increasing or decreasing each of the respective funnel values. Similarly, a modification may be performed with respect to the advertiser specified minimum position at which advertisements are displayed, increasing the prominence of the position at which the advertisements are displayed and thereby increasing the likelihood that the campaign generates a quantity of conversions that matches the advertiser specified target value. Increasing or decreasing one or more of the advertiser specified values that do not correlate or map to the advertiser specified target value results in a modification of the media plan generated for the campaign in a manner that increases the likelihood that the media plan generated for the campaign achieves the advertiser target values.

For example, the advertiser specified values for a given campaign with respect to the one or more funnel values illustrated in FIG. 2 may comprise one ("1") for impressions, two ("2") for leads, four ("4") for browsers, eight ("8") for shoppers, and sixteen ("16") for conversions. Additionally, the advertiser specified value for the campaign with respect to a budget may comprise $2,000, and the advertiser specified value for the average minimum position at which the advertisements in the campaign are to be displayed may comprise the value "5."

The advertiser may further specify a target number of conversions the advertiser wishes to receive, such as two hundred ("200") conversions. The actual performance of the campaign may indicate that the actual number of conversions received is below the advertiser specified target value of 200. Accordingly, a modification may be made to the advertiser specified value associated with the number of conversions received, such as increasing the advertiser specified funnel value associated with conversions from sixteen ("16") to thirty two ("32"), thereby increasing the likelihood that total number of conversions received will match the advertiser specified target value for number of conversions.

Alternatively, or in conjunction with the foregoing, a modification may be made to the one or more advertiser specified values that do not map or correlate to the advertiser specified target value for the number of conversions, such as the funnel values associated with impressions, leads, browsers, and shoppers, or the average minimum position at which advertisements in the campaign are displayed. For example, the values associated with impressions, leads, browsers, and shoppers may be decreased, thereby increasing the relative value associated with conversions. More specifically, by decreasing the value for impressions to 0.5, the value for leads to 1, the value for browsers to 2, and the value for shoppers to 4, the relative value of conversions, 16, is thereby increased. Alternatively, or in conjunction with the foregoing, a the value associated with the average minimum position at which advertisements are displayed may be increased from five ("5") to three ("3"), thereby resulting in the advertisements in the campaign being displayed in a more prominent position, which may result in a greater number of conversions. The modifications of the advertiser specified values associated increases the likelihood that the actual performance of a given campaign matches the one or more advertiser specified target values associated with the campaign.

After the one or more advertiser specified values associated with the one or more metrics in the value funnel have been modified, or if the actual performance of the campaign is equal to the one or more advertiser specified target values, processing terminates. The modified values associated with the one or more metrics in the value in the value funnel may thereafter be used to generate a media plan for the campaign.

Figure 4:
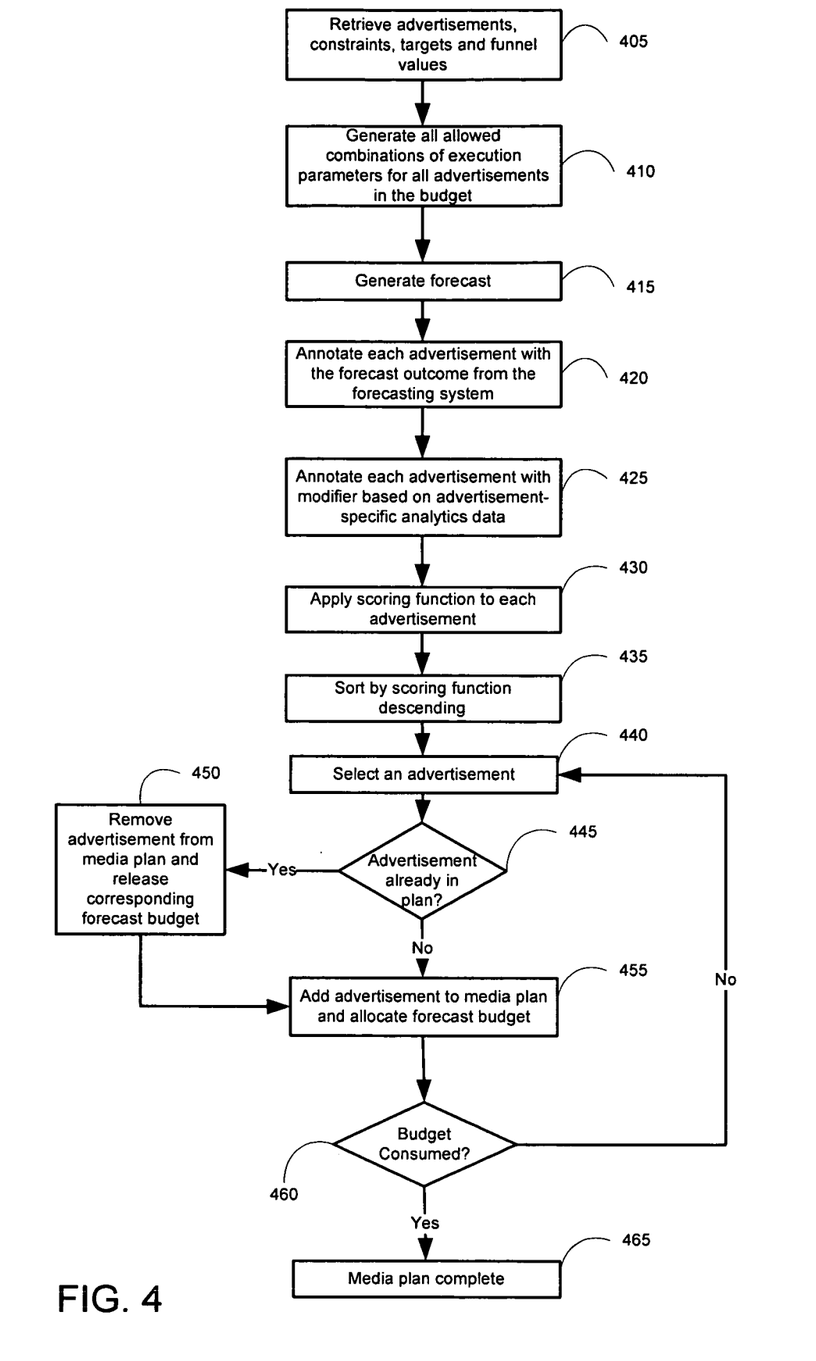
FIG. 4 is a flow diagram presenting a method for generating media plans according to one embodiment of the present invention.

FIG. 4 presents a flow diagram illustrating one embodiment of a method for selecting advertisements from a budget for inclusion in a media plan. One or more advertisements in a given advertiser's budget, as well associated constraint and target information are retrieved, step 405. One or more execution plans are generated, a given execution plan identifying allowed combinations of execution parameters for the retrieved advertisements based upon the advertiser specified target and constraint information, step 410. For example, an advertiser may specify that an advertisement displayed in response to the term "notebook computer" is to be displayed in position one or two of a ranked list of advertisements. An advertiser may further specify that the maximum bid for the term "notebook computer" is three dollars. The one or more execution plans may identify various execution parameters with varying bid amounts for the term "notebook computer." The one or more advertisements and associated target and constraint information are used to generate permutations of the allowed execution parameters for a given advertiser's budget.

The one or more key words associated with displaying the one or more advertisements in a given advertiser's budget may be used by a forecasting component to generate a forecast of the performance of a given advertisement, step 415. A forecasting component may receive one or more keywords and provide information, using historical data, on the one or more advertisements displayed in response to the one or more keywords. With reference to the value funnel illustrated in FIG. 2, the forecasting component may determine the expected number of impressions, leads, browsers, shoppers and conversions, the return on advertisement spend as well as other events, for one or more advertisements displayed in response to one or more keywords at a particular bid amount based upon historical data.

The execution parameters for the one or more execution plans for a given advertiser's budget are annotated with the forecast data, step 420. For example, a given advertisement for the key words "notebook computer" may have a maximum bid constraint of $1 and a minimum rank position of four. The forecast data may indicate that a bid of eighty-nine cents for displaying an advertisement in response to the query "notebook computer" results in an advertisement being displayed in position four of a ranked list of advertisements. The forecast data may further indicate that a bid of eighty-nine cents results in an average of one hundred impressions, fifty leads, thirty browsers, twenty shoppers, and two conversions. The execution plan identifying a bid of eighty-nine cents for the term "notebook computer" is annotated with the corresponding forecast data.

Similarly, the forecast data may indicate that a bid of ninety-three cents for displaying an advertisement in response to the query "notebook computer" results in an advertisement being displayed in position three of a ranked list of advertisements. The forecast data may further indicate that a bid of ninety-three cents for the term "notebook computer" results in an average of two hundred impressions, eighty leads, forty browsers, thirty shoppers, and eight conversions. The execution plan identifying a bid of ninety-three cents for the term "notebook computer" is annotated with the corresponding forecast data. The various bid execution parameters of the one or more execution plans for the advertisements in an advertiser's budget are annotated with the corresponding forecast data.

The execution parameters of the one or more execution plans for a given advertiser's budget may be further annotated with advertisement specific analytics data, step 425. For example, the forecast data may indicate that an advertisement displayed in response to the query terms "notebook computer" at a bid of ninety-five cents will receive an average of one hundred impressions, fifty leads, thirty browsers, twenty shoppers, and two conversions. However, analytics data may indicate that a given advertisement performed better or worse than indicated by the forecast data. For example, a given advertisement displayed in response to the terms "notebook computer" may have actually received two hundred impressions, eighty leads, forty browsers, thirty shoppers and three conversions. The execution parameters for the one or more execution plans are thus annotated with advertisement specific analytics data indicating the actual performance of the one or more advertisements in a given execution plan, step 425.

A scoring function is applied to the execution parameters of a given execution plan using the forecast data, the advertisement specific analytics data and the advertiser specified values in the value funnel associated with the one or more advertising events, step 430. The scoring function is used to calculate an efficiency value for the one or more advertisements in a given advertiser's budget based upon the execution parameters associated with a given advertisement in a given execution plan. Table B illustrates one embodiment of a scoring function that may be used to calculate an efficiency value of a given advertisement based upon the execution parameters of a given execution plan.

TABLE B $$S(A) = \sum_{m=\{i,l,a,r\}} (F(A_S)_m \times \Delta(A, F(A_S))_m \times V(A)_m)$$

In the equation presented in Table B, S is the scoring function, A is a given advertisement, $A_s$ is the search term for advertisement A, F is the forecast, $\Delta$ is the advertisement specific modifier based upon a given advertisement's analytics data, V is the value function and m is a given step in the value funnel (impressions, leads, browsers, shoppers, conversions and return on ad spend). An efficiency value is calculated for each advertisement in the one or more execution plans for a given advertiser's budget, step 430. The one or more advertisements in the one or more execution plans for a given advertiser's budget are sorted in descending order according to efficiency value, step 435.

A first advertisement is selected from a given execution plan, step 440. A check is performed to determine whether the advertisement selected is already in the media plan being generated, step 445. If the advertisement selected is not in the media plan, the advertisement is added to the media plan, and the cost associated with the advertisement is removed from the budget, step 455. The cost associated with a given advertisement is calculated using the forecast data for a given bid amount for the one or more keywords associated with the given advertisement. For example, the forecast data may indicate that the term "notebook computer" costs ten cents per impression and receives an average of one hundred impressions in a given period of time. Based upon the forecast data, at a bid amount of ten cents, an advertiser will be charged $10.00 (e.g., ten cents per impression*100 impressions) for an advertisement displayed in response to the term "notebook computer."

If the advertisement selected is already in the media plan, step 445, the advertisement in the media plan is removed and the cost associated with the removed advertisement is released from the budget, step 450. The selected advertisement is added to the media plan and the cost associated with the selected advertisement is added to the budget, step 455. A check is performed to determine whether a given advertiser's budget has been exhausted, step 460. If a given advertiser's budget is exhausted, the media plan is complete and may be executed or stored in a data store for later execution or viewing by a given advertiser, step 465. If a given advertiser's budget is not exhausted, a next advertisement from the one or more execution plans is selected for analysis, step 440.

Figure 5:
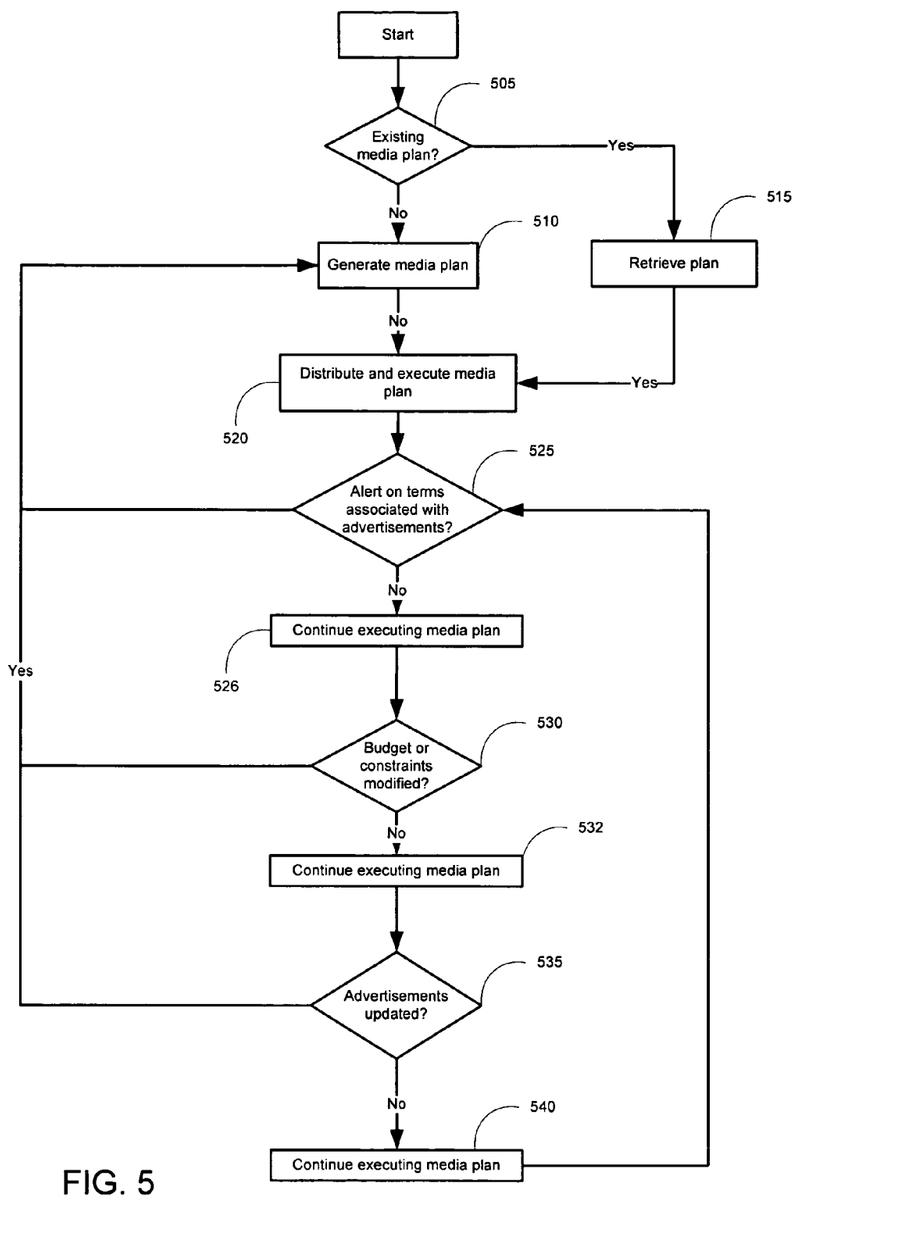
FIG. 5 is a flow diagram presenting a method for executing and monitoring a media plan, according to one embodiment of the present invention.

FIG. 5 presents a flow diagram illustrating one embodiment of a method for executing and monitoring a media plan for one or more advertisements in a given advertiser's budget. A check is performed to determine whether a media plan exists for the one or more advertisements in a given advertiser's budget, step 505. If an existing media plan is found, the media plan may be retrieved, e.g., from a media plan data store, step 515. According to one embodiment of the invention, an advertiser may select a media plan for execution from a plurality of media plans. Alternatively, or in conjunction, a media plan may be automatically selected. If an existing media plan is not found, a new media plan may be generated according to the methods described above, step 510. The one or more advertisements and associated bid execution parameters of a given media plan are delivered to one or more channels, step 520, which according to one embodiment of the invention may comprise a web site or a search engine. The one or more advertisements in a given media plan may be distributed by a given channel based upon bid amount and may be viewed and selected by users of client devices.

According to the embodiment illustrated in FIG. 5, the one or more channels that receive a media plan are monitored to identify trends in the search requests or key words entered by users of client devices associated with one or more advertisements in a media plan. Similarly, the one or more channels that receive a media plan may be monitored to identify trends in the web sites accessed by users of client devices. A check is periodically performed to determine any significant deviations in the quantity of users submitting search requests for terms associated with the one or more advertisements of a given advertiser's budget or users accessing one or more web sites or advertisements associated with one or more terms in order to generate an alert, step 525. If a significant deviation in the quantity of users submitting search requests or accessing advertisements or web sites associated with one or more terms is found, an alert may be generated to create new media plan, step 510. For example, if a significant increase is found for one or more terms, an alert may be generated which results in the construction of a new media plan identifying execution parameters with greater bids for the one or more terms that received increased user requests. If an alert on one or more terms associated with one or more advertisements in a given media plan is not generated, the channel continues to execute the existing media plan, step 526.

A check is performed to determine whether a given advertiser has modified the budget associated with one or more advertisements or whether an advertiser has modified one or more constraints associated with one or more advertisements in a given budget, step 530. If an advertiser has modified a budget or constraint, a new media plan is generated to optimally apportion the modified budget, step 510. Similarly, if an advertiser has modified a constraint, a new media plan is generated taking into account the modified constraints, step 510. If an advertiser has not modified an existing budget or any constraints associated with one or more advertisements in a given budget, the channel continues to execute the existing media plan, step 532.

An additional check is performed to determine whether an advertiser has modified any of the one or more advertisements in a given advertiser's budget, step 535. If an advertisement has been removed from or added to an existing budget, a new media plan is generated for the modified budget over a set of advertisements, step 510. If no modifications have been made to the advertisements in an existing budget, the channel continues executing the media plan, step 540.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

I claim:

1. A computerized method for generating one or more media plans for the distribution of one or more advertisements of a campaign, the method comprising:
    retrieving, from a computer readable medium with a processor of a computing device, an advertiser specified budget for a campaign comprising a plurality of keyword responsive advertisements, a plurality of constraints for each of the plurality of advertisements, and one or more advertiser specified metric target values associated with the campaign,
    wherein the metric target values are identified with the budget and the constraints, and comprise a first value including an indication of a value of a user selecting an advertisement and adding one or more items to a shopping cart on an advertiser web site, and a second value comprising an indication of a value selected from the group consisting of:
        displaying the advertisement,
        a user selection of the advertisement, and
        a user selecting the advertisement and browsing an advertiser web site associated with the advertisement;
    generating, using the processor, for each of a plurality of advertisements of the campaign, a forecast of performance of at least one of the metric target values of the advertisement based on the constraints specified by the advertiser and analytics data of the advertisement;
    retrieving an advertiser specified step, of a plurality of steps in a value funnel, for each of the metric target values of respective advertisements;
    calculating, using a processor executing a scoring function, an efficiency value for the plurality of advertisements of the campaign, the efficiency value calculated based on a combination of, for respective advertiser specified steps in the value funnel:
        (i) a forecast of performance of a search term for the advertisement;
        (ii) the forecast of performance calculated for the at least one of the metric target values; and
        (iii) a value function applied to the at least one of the metric target values;
    sorting, using the processor, the plurality of advertisements of the campaign in descending order by efficiency value;
    determining, using the processor, a forecasted cost for respective advertisements of the campaign based on their bid amounts; and
    selecting, using the processor and successively from the greatest efficiency values, the sorted advertisements for a media plan until a sum of the forecasted cost of the selected advertisements added to the media plan exhaust the budget of the campaign.

2. The method of claim 1 wherein retrieving one or more metric target values comprises retrieving a value indicating a desired cost per acquisition of a conversion.

3. The method of claim 1 wherein retrieving one or more advertising metric target values comprises retrieving a value indicating a desired return on advertisement spend.

4. The method of claim 1 wherein retrieving one or more advertising metric target values comprises retrieving a value indicating a desired cost per impression of an advertisement in the campaign.

5. The method of claim 1 wherein retrieving one or more advertising metric target values comprises retrieving a value indicating a desired cost per selection of an advertisement in the campaign.

6. The method of claim 1 further comprising the processor:
    generating allowed combinations of the constraints and the first and second metric target values for the plurality of advertisements operable within the budget;
    determining actual performance of the campaign with respect to the allowed combinations of the constraints and the first and second metric target values within the budget;
    determining that the actual performance does not meet respective combination of constraints and the first and second metric target values, and a difference between the actual performance and corresponding metric target values;

executing an increase or a decrease of one or more of: the first and second metric target values, the constraints, and the budget responsive to the determined difference; and generating the one or more media plans for the campaign through use of the increased or decreased of the one or more of the first and second metric target values, constraints, and budget.

7. The method of claim 6 wherein determining the actual performance comprises calculating the actual performance based on analytics data associated with the plurality of advertisements retrieved from an analytics data store, wherein the analytics data comprises data indicating the frequency with which the one or more advertisements in the campaign were displayed to one or more users.

8. The method of claim 6 wherein determining the actual performance comprises calculating the actual performance based on analytics data associated with the plurality of advertisements retrieved from an analytics data store, wherein the analytics data comprises data indicating the frequency with which the one or more advertisements in the campaign resulted in one or more users browsing an advertiser web site.

9. The method of claim 6 wherein determining the actual performance comprises calculating the actual performance based on analytics data associated with the plurality of advertisements retrieved from an analytics data store, wherein the analytics data comprises data indicating the frequency with which the one or more advertisements in the campaign resulted in one or more users adding one or more items to a shopping cart on an advertiser web site.

10. The method of claim 6 wherein determining the actual performance comprises calculating the actual performance based on analytics data associated with the plurality of advertisements retrieved from an analytics data store, wherein the analytics data comprises data indicating the frequency with which the one or more advertisements in the campaign resulted in one or more conversions.

11. The method of claim 10 wherein determining the actual performance comprises calculating the actual performance based on analytics data associated with the plurality of advertisements retrieved from an analytics data store, wherein the analytics data comprises data indicating revenue generated by the one or more conversions.

12. The method of claim 1 wherein the budget indicates a maximum dollar amount to be spent on the campaign.

13. The method of claim 1 wherein the plurality of constraints comprise an indication of a minimum position at which the one or more advertisements in the campaign may be displayed in a ranked list of advertisements.

14. The method of claim 1 wherein the plurality of constraints comprise a maximum bid amount.

15. The method of claim 1 wherein generating the one or more media plans further comprises:

generating one or more execution plans comprising one or more execution parameters for distributing the one or more advertisements in the campaign, wherein the execution parameters are annotated with analytics data and forecast data generated from user interactions with the plurality of keyword responsive advertisements; and applying a scoring function to the execution parameters to select the topmost of the one or more advertisements based on cost.

16. The method of claim 1, wherein the efficiency value for each of the plurality of advertisements in the campaign is calculated as:

$$S(A) = \sum_{m=[i,l,a,r]} (F(A_S)_m \times \Delta(A, F(A_S))_m \times V(A)_m)$$

where S is the scoring function, A is the respective advertisement, $A_s$ is the search term for advertisement A, F is the forecast of performance, $\Delta$ is a advertisement specific modifier based on the advertisement A's analytics data, V is the value function that takes a metric target value as an input, and m is a step of the metric target value in the value funnel.

17. The method of claim 6 wherein determining the actual performance comprises calculating the actual performance based on analytics data associated with the plurality of advertisements retrieved from an analytics data store, wherein the analytics data comprises data indicating the frequency with which the one or more advertisements in the campaign were selected by one or more users.

18. A non-transitory computer readable media comprising program code that when executed instructs a processor to perform a method for generating one or more media plans for the distribution of one or more advertisements of a campaign, the method comprising:

retrieving, from a computer readable medium with a processor of a computing device, an advertiser specified budget for a campaign comprising a plurality of keyword responsive advertisements, a plurality of constraints for each of the plurality of advertisements, and one or more advertiser specified metric target values associated with the campaign, wherein the metric target values are identified with the budget and the constraints, and comprise a first value comprising an indication of a value of a user selecting an advertisement and adding one or more items to a shopping cart on an advertiser web site, and a second value comprising an indication of a value selected from the group consisting of:

displaying the advertisement, a user selection of the advertisement, and a user selecting the advertisement and browsing an advertiser web site associated with the advertisement;

generating, using the processor, for each of a plurality of advertisements of the campaign, a forecast of performance of at least one of the metric target values of the advertisement based on the constraints specified by the advertiser and analytics data of the advertisement;

retrieving an advertiser specified step, of a plurality of steps in a value funnel, for each of the metric target values of respective advertisements;

calculating, using a processor executing a scoring function, an efficiency value for the plurality of advertisements of the campaign, the efficiency value calculated based on a combination of, for respective advertiser specified steps in the value funnel:

(i) a forecast of performance of a search term for the advertisement;

(ii) the forecast of performance calculated for the at least one of the metric target values; and (iii) a value function applied to the at least one of the metric target values;

sorting, using the processor, the plurality of advertisements of the campaign in descending order by efficiency value;

determining, using the processor, a forecasted cost for respective advertisements of the campaign based on their bid amounts; and selecting, using the processor and successively from the greatest efficiency values, the sorted advertisements for a media plan until a sum of the forecasted cost of the selected advertisements added to the media plan exhaust the budget of the campaign.

19. The computer readable media of claim 18 wherein the instructions for retrieving comprise instructions for retrieving a value indicating a desired cost per acquisition of a conversion.

20. The computer readable media of claim 18 wherein the instructions for retrieving comprise instructions for retrieving a value indicating a desired return on advertisement spend.

21. The computer readable media of claim 18 wherein the instructions for retrieving comprise instructions for retrieving a value indicating a desired cost per impression of an advertisement in the campaign.

22. The computer readable media of claim 18 wherein the instructions for retrieving comprise instructions for retrieving a value indicating a desired cost per selection of an advertisement in the campaign.

23. The computer readable media of claim 18 wherein the budget indicates a maximum dollar amount to be spent on the campaign.

24. The computer readable media of claim 18 wherein the plurality of constraints comprise a maximum bid amount.

25. The computer readable media of claim 18 wherein the plurality of constraints comprise a minimum position at which advertisements in the campaign may be displayed in a ranked list of advertisements.

26. The computer readable media of claim 18 wherein the instructions for generating the one or more media plans further comprises:
   instructions for generating one or more execution plans comprising one or more execution parameters for distributing the one or more advertisements in the campaign, wherein the execution parameters are annotated with analytics data and forecast data generated from user interactions with the plurality of keyword responsive advertisements; and
   instructions to apply a scoring function to the execution parameters to select the topmost of the one or more advertisements based on cost.

27. The computer readable media of claim 18 further comprising instructions for the processor:
   generating allowed combinations of the constraints and the first and second metric target values for the plurality of advertisements operable within the budget;
   determining actual performance of the campaign with respect to the allowed combinations of the constraints and the first and second metric target values within the budget;
   determining that the actual performance does not meet respective combination of constraints and the first and second metric target values, and a difference between the actual performance and corresponding metric target values;
   executing an increase or a decrease of one or more of: the first and second metric target values, the constraints, and the budget responsive to the determined difference; and
   generating the one or more media plans for the campaign through use of the increased or decreased of the one or more of the first and second metric target values, constraints, and budget.

28. The computer readable media of claim 27 wherein instructions to determine the actual performance comprises instructions to calculate the actual performance based on analytics data associated with the plurality of advertisements retrieved from an analytics data store, wherein the analytics data comprises data indicating the frequency with which the one or more advertisements in the campaign were selected by one or more users.

29. The computer readable media of claim 27 wherein instructions to determine the actual performance comprises instructions to calculate the actual performance based on analytics data associated with the plurality of advertisements retrieved from an analytics data store, wherein the analytics data comprises data indicating the frequency with which the one or more advertisements in the campaign were displayed to one or more users.

30. The computer readable media of claim 27 wherein instructions to determine the actual performance comprises instructions to calculate the actual performance based on analytics data associated with the plurality of advertisements retrieved from an analytics data store, wherein the analytics data comprises data indicating the frequency with which the one or more advertisements in the campaign resulted in one or more users browsing an advertiser web site.

31. The computer readable media of claim 27 wherein instructions to determine the actual performance comprises instructions to calculate the actual performance based on analytics data associated with the plurality of advertisements retrieved from an analytics data store, wherein the analytics data comprises data indicating the frequency with which the one or more advertisements in the campaign resulted in one or more users adding one or more items to a shopping cart on an advertiser web site.

32. The computer readable media of claim 27 wherein instructions to determine the actual performance comprises instructions to calculate the actual performance based on analytics data associated with the plurality of advertisements retrieved from an analytics data store, wherein the analytics data comprises data indicating the frequency with which the one or more advertisements in the campaign resulted in one or more conversions.

33. The computer readable media of claim 32 wherein instructions to determine the actual performance comprises instructions to calculate the actual performance based on analytics data associated with the plurality of advertisements retrieved from an analytics data store, wherein the analytics data comprises data indicating revenue generated by the one or more conversions.

34. A system for generating one or more media plans for the distribution of one or more advertisements of a campaign, the system comprising:
   a media plan data store associated with a computer readable medium;
   an advertisement data store associated with a computer readable medium comprising an advertiser specified budget for a campaign comprising a plurality of keyword responsive advertisements, a plurality of constraints for each of the plurality of advertisements, and one or more advertiser specified metric target values, wherein the metric target values are identified with the budget and the constraints, and comprise a first value comprising an indication of a value of a user selecting an advertisement and adding one or more items to a shopping cart on an advertiser web site, and a second value comprising an indication of a value selected from the group consisting of:

displaying the advertisement,
a user selection of the advertisement, and
a user selecting the advertisement and browsing an advertiser web site associated with the advertisement;
an analytics data store comprising analytics data related to the advertisement data store;
a campaign optimizer, by invoking a spend planner component at regular intervals, is executable by a processor and operative to:
generate for each of a plurality of advertisements of the campaign, a forecast of performance of at least one of the metric target values of the advertisement based on the constraints specified by the advertiser and the analytics data of the advertisement;
retrieve an advertiser specified step, of a plurality of steps in a value funnel, for each of the metric target values of respective advertisements;
calculate, by executing a scoring function, an efficiency value for the plurality of advertisements of the campaign, the efficiency value calculated based on a combination of, for respective advertiser specified steps in the value funnel:
(i) a forecast of performance of a search term for the advertisement;
(ii) the forecast of performance calculated for the at least one of the metric target values; and
(iii) a value function applied to the at least one of the metric target values;
sort the plurality of advertisements of the campaign in descending order by efficiency value;
determine a forecasted cost for respective advertisements of the campaign based on their bid amounts; and
select, successively from the greatest efficiency values, the sorted advertisements for a media plan until a sum of the forecasted cost of the selected advertisements added to the media plan exhaust the budget of the campaign.

35. The system of claim 34 wherein analytics data comprises data indicating the frequency with which the one or more advertisements in the campaign were selected by one or more users.

36. The system of claim 34 wherein analytics data comprises data indicating the frequency with which the one or more advertisements in the campaign were displayed to one or more users.

37. The system of claim 34 wherein analytics data comprises data indicating the frequency with which the one or more advertisements in the campaign resulted in one or more users browsing an advertiser web site.

38. The system of claim 34 wherein analytics data comprises data indicating the frequency with which the one or more advertisements in the campaign resulted in one or more users adding one or more items to a shopping cart on an advertiser web site.

39. The system of claim 34 wherein analytics data comprises data indicating the frequency with which the one or more advertisements in the campaign resulted in one or more conversions.

40. The system of claim 39 wherein analytics data comprises data indicating revenue generated by the one or more conversions.

41. The system of claim 34 wherein a second metric target value comprises an indication of a value of a user selecting an advertisement in the campaign and browsing an advertiser web site associated with the selected advertisement.

42. The system of claim 34 wherein the budget indicates a maximum dollar amount to be spent on the campaign.

43. The system of claim 34 wherein a constraint comprises an indication of a minimum position at which the one or more advertisements in the campaign may be displayed in a ranked list of advertisements.

44. The system of claim 34 wherein a constraint comprises a maximum bid amount.

45. The system of claim 34 wherein the campaign optimizer is operative to generate the one or more media plans comprises generating one or more execution plans comprising one or more execution parameters for distributing the one or more advertisements in the campaign, wherein the execution parameters are annotated with the analytics data and forecast data generated from the plurality of keyword responsive advertisements, and a scoring function is applied to the execution parameters to select the topmost of the one or more advertisements based on cost.

46. The system of claim 34 further comprising:
an actual performance component operative to:
generate allowed combinations of the constraints and the first and second metric target values for the plurality of advertisements operable within the budget;
determine, from the analytics data, actual performance of the campaign with respect to the allowed combinations of the constraints and the first and second target metric values within the budget;
an extend campaign optimizer operative to:
determine that the actual performance does not meet respective combination of constraints and the first and second target metric values, and a difference between the actual performance and corresponding metric target values;
execute an increase or a decrease of one or more of: the first and second metric target values, the constraints, and the budget responsive to the determined difference; and
wherein the campaign optimizer is further operative to generate the one or more media plans for the campaign through use of the increased or decreased of the one or more of the first and second metric target values, constraints, and budget, the media plan being stored in the computer readable medium associated with the media plan data store.

* * * * *